United States Patent
Bushee

(10) Patent No.: US 6,711,569 B1
(45) Date of Patent: Mar. 23, 2004

(54) METHOD FOR AUTOMATIC SELECTION OF DATABASES FOR SEARCHING

(75) Inventor: William J. Bushee, Sioux Falls, SD (US)

(73) Assignee: Bright Planet Corporation, Sioux Falls, SD (US)

( * ) Notice: Subject to any disclaimer, the term of this patent is extended or adjusted under 35 U.S.C. 154(b) by 239 days.

(21) Appl. No.: 09/911,452

(22) Filed: Jul. 24, 2001

(51) Int. Cl.$^7$ ................................................ G06F 17/30
(52) U.S. Cl. ................... 707/5; 707/6; 707/10; 707/104.1; 715/501.1; 715/513
(58) Field of Search ................... 707/3, 5, 6, 9, 707/10, 101, 102, 103 R, 2, 4, 100, 104.1; 715/501.1, 513; 709/233

(56) References Cited

U.S. PATENT DOCUMENTS

| | | | | |
|---|---|---|---|---|
| 5,257,185 A | * | 10/1993 | Farley et al. | ............... 707/100 |
| 5,321,833 A | * | 6/1994 | Chang et al. | ................... 707/5 |
| 5,338,976 A | * | 8/1994 | Anwyl et al. | ................... 704/2 |
| 5,446,891 A | * | 8/1995 | Kaplan et al. | ................... 707/2 |
| 5,721,902 A | * | 2/1998 | Schultz | ........................... 707/4 |
| 5,778,363 A | * | 7/1998 | Light | ............................. 707/5 |
| 5,826,031 A | * | 10/1998 | Nielsen | ....................... 709/233 |
| 5,835,905 A | * | 11/1998 | Pirolli et al. | .................... 707/3 |
| 6,112,202 A | * | 8/2000 | Kleinberg | ....................... 707/5 |
| 6,418,433 B1 | * | 7/2002 | Chakrabarti et al. | ........... 707/5 |
| 6,510,427 B1 | * | 1/2003 | Bossemeyer et al. | .......... 707/6 |

FOREIGN PATENT DOCUMENTS

| | | | | |
|---|---|---|---|---|
| JP | 11224292 A | * | 8/1999 | ........... G06F/17/60 |
| JP | 411224256 A | * | 8/1999 | ........... G05F/17/30 |
| WO | WO 9204681 A1 | * | 3/1992 | ........... G06F/15/40 |
| WO | WO 9712333 A1 | * | 4/1997 | ........... G06F/17/27 |

* cited by examiner

*Primary Examiner*—Shahid Alam
(74) *Attorney, Agent, or Firm*—Kaardal & Leonard, LLP

(57) ABSTRACT

A method for automatic selection of databases for improving the efficiency of data capture and management systems. The method for automatic selection of databases includes obtaining a candidate database listing providing a uniform resource locator (URL) for each one of a plurality of candidate databases to be considered during selection, obtaining a query from a user, matching a subset of candidate databases to said query, and storing a listing of selected databases to be used for retrieving information relative to said query.

2 Claims, 2 Drawing Sheets

METHOD FOR AUTOMATIC SELECTION OF DATABASES FOR SEARCHING

INCORPORATION BY REFERENCE

This patent application discloses an invention which may optionally form a portion of a larger system. Other portions of the larger system are disclosed and described in the following patent applications, all of which are subject to an obligation of assignment to the same person. The disclosures of these applications are herein incorporated by reference in their entireties.

METHOD AND SYSTEM FOR AUTOMATIC HARVESTING AND QUALIFICATION OF DYNAMIC DATABASE CONTENT, William J. Bushee, Thomas W. Tiahrt, and Michael K. Bergman, and Filed Jul. 24, 2001, application Ser. No. 09/911,522 now pending.

AUTOMATIC SYSTEM FOR CONFIGURING TO DYNAMIC DATABASE SEARCH FORMS, William J. Bushee, Filed Jul. 24, 2001, application Ser. No. 09/911,435 now pending.

SYSTEM AND METHOD FOR EFFICIENT CONTROL AND CAPTURE OF DYNAMIC DATABASE CONTENT, William J. Bushee and Thomas W. Tiahrt, Filed Jul. 24, 2001, application Ser. No. 09/911,434 now pending.

SYSTEM FOR AUTOMATICALLY CATEGORIZING CONTENT IN HIERARCHICAL SUBJECT STRUCTURES, Thomas W. Tiahrt, Michael K. Bergman, and William J. Bushee, Filed Jul. 24, 2001, application Ser. No. 09/911,433 now pending.

SYSTEM AND METHOD FOR FLEXIBLE INDEXING OF DOCUMENT CONTENT, Thomas W. Tiahrt, Filed Jul. 24, 2001, application Ser. No. 09/911,432 now pending.

BACKGROUND OF THE INVENTION

1. Field of the Invention

The present invention relates to search engines and more particularly pertains to a new method for automatic selection of databases for improving the efficiency of data capture and management systems.

2. Description of the Prior Art

The Internet is a worldwide system of computer networks in which users at any one computer may get information located on virtually any other computer with appropriate authorization. The Internet uses a set of protocols called Transmission Control Protocol/Internet Protocol or TCP/IP. The World Wide Web (often abbreviated as WWW) is a portion of the Internet using hypertext as a method for rapid cross-referencing that links one document or site to another.

A database is a collection of data, which is organized in a manner that allows its contents to be easily accessed, managed, and updated. Given this definition an Internet site can be viewed as a database with a collection of data that can be viewed as pages, or accessible documents. Similarly, any network for accessing documents can be considered a database, including intranets and extranets. These network databases can be either static or dynamic. A static network database provides the same set of documents or pages to every user. A dynamic network database presents unique documents or pages to different users, typically as a response to the users' queries. Because of the similarity between web sites specifically and databases in general the terms document and web page are used synonymously throughout this document unless otherwise distinguished by context. Similarly, the terms search engine and database are also used synonymously throughout this document unless otherwise distinguished by context.

Many enterprises, whether business, governmental, or other coordinated undertakings, require large amounts of "current" information to be analyzed and available for use in the daily execution of their activities. The Internet has made the availability information in near real time a reality. However, this very current information is distributed across several thousand, if not millions, of computer systems linked to the Internet. Additionally, this information may be stored in various different formats, such as documents, web pages, and other machine readable formats. Locating information relevant to a specific query posed by a user often requires specific knowledge of the information's location, sophisticated search strategies and even professional researchers. The use of search engines to locate information related to a user's query is well known and has to some extent sped up the process of locating related information.

A significant portion of related information returned by search engines may not be considered truly relevant to a user's query. The resources required to evaluate all of the information identified by a search engine in order to filter out non-relevant information can be more than substantial. The resources used may include, by way of example and not limitation, transmission bandwidth, data storage, and time (both of system usage and of personnel) required to filter out related but not relevant information. The need to capture and organize relevant information can be overwhelming, and an automated system is required to effectively solve this problem.

In these respects, the method for automatic selection of databases according to the present invention substantially departs from the conventional concepts and designs of the prior art, and in so doing provides a system primarily developed for the purpose of improving the efficiency of data capture and management systems.

SUMMARY OF THE INVENTION

In view of the foregoing disadvantages inherent in the known types of search engines now present in the prior art, the present invention provides a new method for automatic selection of databases construction wherein the same can be utilized for improving the efficiency of data capture and management systems.

The invention contemplates a method of selection and characterization of search engines and databases which includes obtaining a candidate database listing providing a uniform resource locator (URL) for each one of a plurality of candidate databases to be considered during selection, obtaining a query from a user, matching a subset of candidate databases to said query, and storing a listing of selected databases to be used for retrieving information relative to said query.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
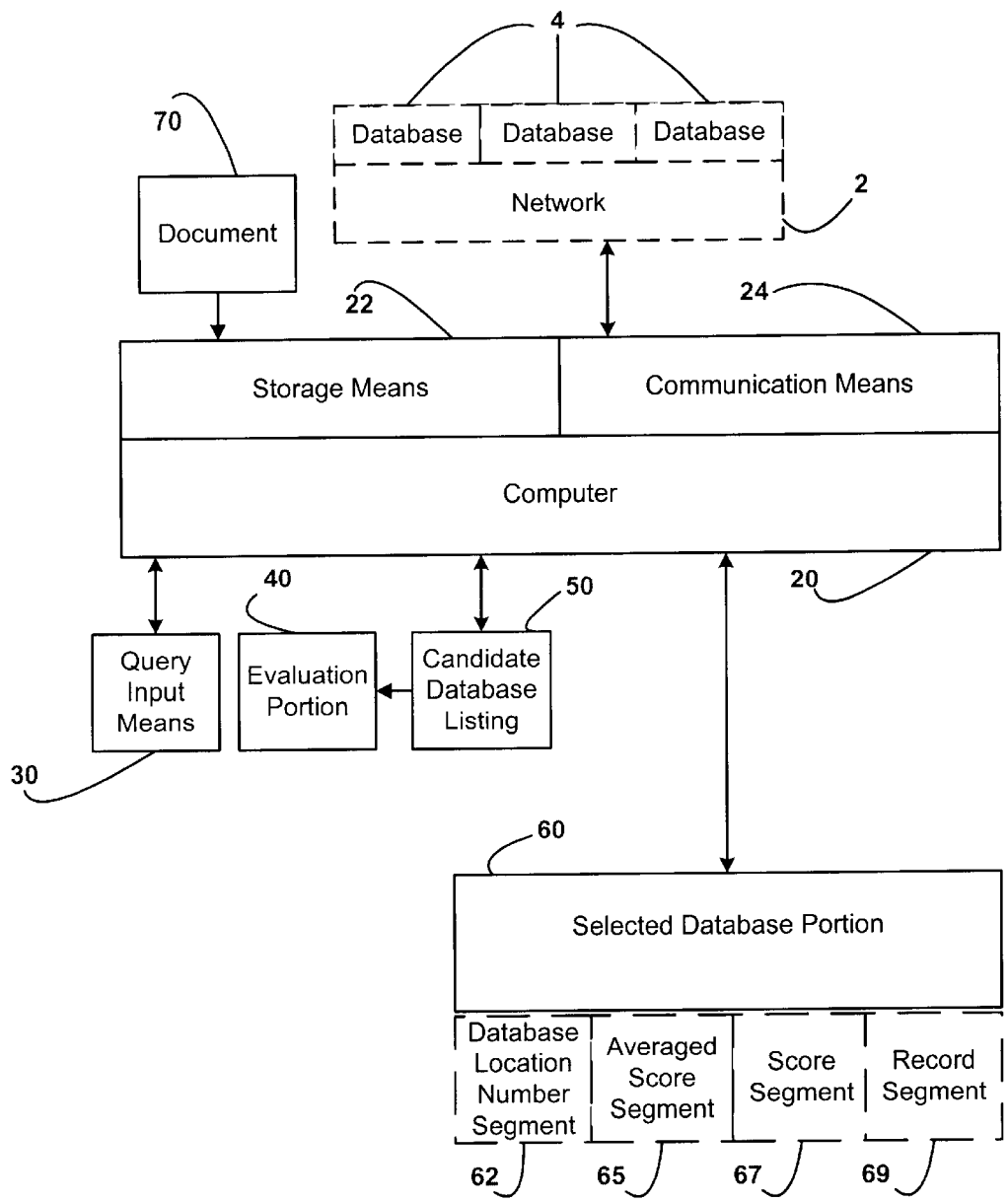
FIG. 1 is a schematic functional interconnect view of a new system for automatic selection of databases according to the present invention.
Figure 2:
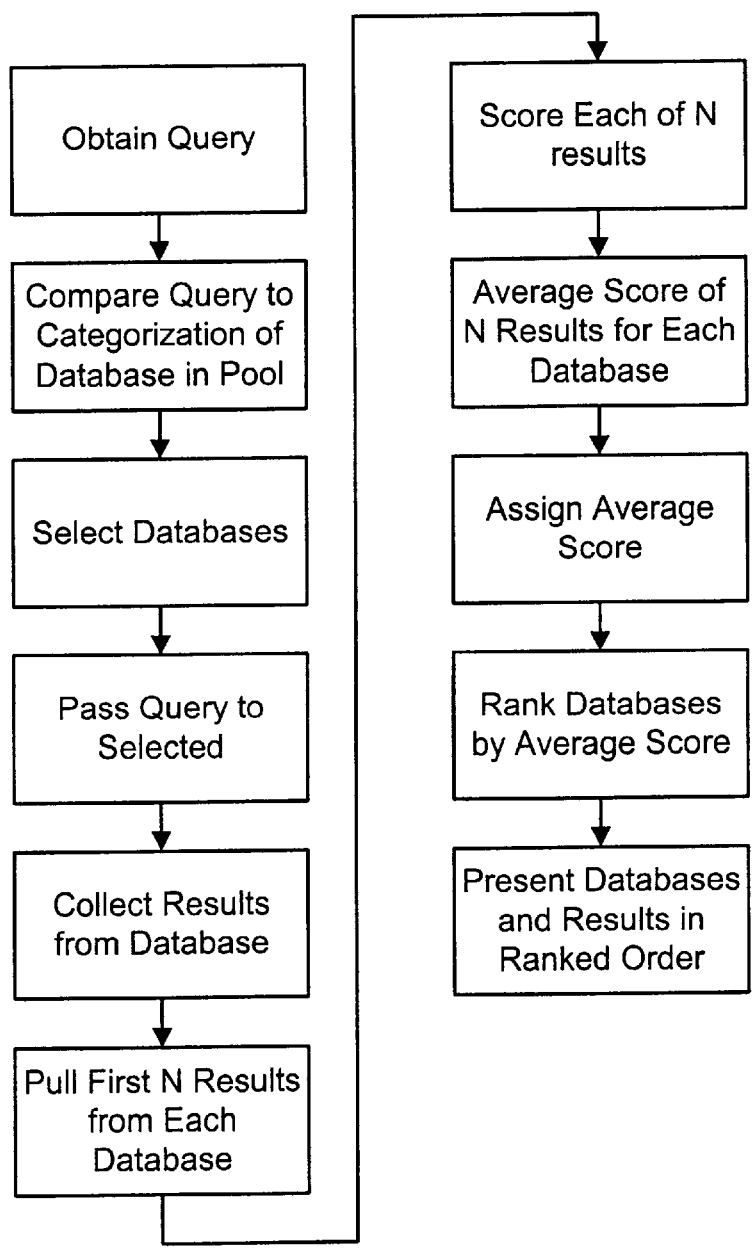
FIG. 2 is a schematic flow diagram of a method aspect of the present invention.

With reference now to the drawings, and in particular to FIGS. 1 and 2 thereof, a new method for automatic selection of databases embodying the principles and concepts of the present invention will be described.

As best illustrated in FIG. 1, the system 10 for the automatic selection of databases generally comprises a computer system 20, a query input means 30, and an evaluation portion 40.

The computer system 20 includes a storage means 22 for facilitating the retention and recall of dynamic database content and a communications means 24 for performing bi-directional communication between the computer system 20 and a network 2.

The query input means 30 of the system 10 is used for receiving a plurality of queries from a user and transferring the plurality of queries to a plurality of databases 4.

The evaluation portion 40 of the system 10 is used for capturing, storing and scoring a plurality of responsive documents 70 (such as, for example, web pages) returned by each one of the plurality of databases 4 in response to the user's query.

A candidate database listing 50 may provide an index of uniform resource locators (URLs) for each database 4 to be considered for selection in response to the user's query.

The evaluation portion 40 determines a page score for a numerical representation of each one of the responsive documents 70 associated with each one of the plurality of databases 4. The range score is a numerical representation of the relative relevancy of the document 70 to the user's query. The evaluation portion further determines an averaged score for each one of the plurality of databases 4 based upon an average of each one of the page scores. The averaged score is used to evaluate the relevancy of the database 4 to the user's query.

A selected database portion 60 provides information related to each one of the plurality of databases 4 being selected as relevant to the user's query. The selected database portion 60 may provide a plurality of fields for storing this information about each of the databases.

In one embodiment of the invention, the plurality of fields include a database location number segment 62, an averaged score segment 64, a plurality of score segments 66, and a plurality of record segments 68. The database location number segment 62 provides a cross-reference to a location in the candidate database listing 50 of a URL associated with the database 4. The averaged score segment 64 records the averaged score for the database 4 for the user's query. Each one of the plurality of score segments 66 record the page score for one of the responsive documents 70 used to determine the averaged score for the database 4. Each one of the record segments 68 provides a cross-reference to a location of each one of the responsive documents 70 in a storage medium.

Each of the database location segments 62 and the record segments 68 may comprise a 64-bit representation of location for facilitating access to more than 4.3 billion discrete locations.

A listing of candidate databases is provided to the system for consideration with respect to a query or series of queries provided by a user. The queries may be provided directly by the user, or may be passed to the system through a file transfer or file access process.

The subject query being processed is forwarded or passed to each of the candidate databases (e.g. from the listing) and waits for the databases to provide responsive web pages. Typically these responsive web pages will provide URLs for responsive documents. Each URL may be followed to the document and a copy of the associated document is captured for evaluation.

An evaluation parameter may be used to define a maximum number of responsive documents to be captured from each one of the plurality of databases. In a preferred embodiment the evaluation parameter may be set and adjusted by the user to a maximum number of responsive documents. The evaluation parameter preferably may have a value in the range between 2 and 20 (inclusive) documents. More preferably, the evaluation parameter has a value falling in the range between 4 and 10 documents (inclusive). Most preferably, the evaluation parameter has a value of approximately 5 documents.

A database providing the documents (such as a search engine) may also indicate relative scores or rankings for the relevancy of each of the documents with respect to the query based upon various factors determined by the entity operating the database. In a preferred embodiment, the documents captured for storage and analysis are the documents with the highest associated scores or rankings determined by the source database.

Each of the captured documents copies is stored on the system for recall and analysis without having to return to the source databases of the documents.

Each of the documents (e.g. web pages) is then evaluated for the number of occurrences of the term or terms of the query in the document and the title of the document. The length of the document may also be determined for evaluating relevancy. This information is used to determine a numerical score for each document. The numerical scores for each document retrieved from a database are averaged together, and this averaged score is then assigned to the database as an indication of relevance of that database to the user's query.

The databases may be sorted or ranked by averaged score such that databases with relatively higher averaged scores are presented to the user before databases with relatively lower averaged scores.

An information stream may be created which contains multiple information portions. Each information portion is associated with each one of the databases still under consideration after initial screening or filtering.

In a preferred embodiment, the information portions may include a database location number segment, an average score segment, a plurality of score segments, and a plurality of record segments. The database location number segments provide a cross-reference to a location of the database in the candidate database listing. Each of the score segments provides the numerical scores determined for each of the responsive pages used to develop the averaged score. Each of the record segments provides a cross-reference to a location of each of the captured copies of the responsive pages.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A method for the automatic selection and characterization of search engines and databases comprising:

obtaining a candidate database listing providing a uniform resource locator (URL) for each one of a plurality of candidate databases to be considered during selection;

obtaining a query from a user;

submitting the query from the user to each one of said plurality of candidate databases;

obtaining an evaluation parameter providing a predetermined number of responsive documents to capture;

selecting a number of URLs associated with responsive documents corresponding to said evaluation parameter, said responsive documents being selected according to a score provided by said database such that higher scoring responsive documents are selected over lower scoring responsive documents;

collecting a document associated with each one of said URLs;

storing each one of said documents for analysis;

evaluating each responsive documents for occurrence of the query term, length of said responsive documents, and title of said responsive documents;

creating a page score for each one of said responsive documents associated with each one of said plurality of databases;

calculating an averaged score for each one of said databases based upon an average of all of said pages scores associated with each one of said databases;

associating said averaged score with said database and the user's query;

sorting said candidate listing of databases by said averaged score such that relatively higher scoring databases are presented substantially before relatively lower scoring databases;

storing said listing of selected databases associated with the user's query;

creating an information stream having a plurality of information portions, each one of said information portions being associated with one of said plurality of selected databases;

creating a plurality of fields within each one of said plurality of information portions, said plurality of fields including a database location number segment providing a cross-reference to a location of said database in said candidate database listing, an average score segment for storing said averaged score for said database associated with the user's query, a plurality of score segments for storing each one of said page scores associated with said database, a plurality of record segments for storing a location of each one of said responsive documents associated with said database;

sorting said plurality of information portions such that information portions associated with relatively higher scoring databases are positioned earlier in said information stream than information portions associated with relatively lower scoring databases; and writing said information stream to a storage medium to provide a selected listing of databases associated with the user's query to be polled for relative information.

2. A system for the automatic selection of websites comprising:

a computer system having a storage means for facilitating the retention and recall of dynamic database content, said computer system having a communications means for performing bi-directional communication between said computer system and a network;

a query input means for receiving a plurality of queries from a user and transferring the plurality of queries to a plurality of databases;

an evaluation portion for capturing, storing and scoring a plurality of responsive documents returned by said databases;

an evaluation parameter defining a maximum number of responsive documents to be captured for each one of said plurality of databases;

a candidate database listing providing an index of uniform resource locators (URLs) for each database to be considered for selection in response to the user's query;

said evaluation portion determines a page score as a numerical representation of each one of said responsive documents associated with each one of said plurality of databases, said evaluation portion further determining an averaged score for each one of said plurality of databases based upon an average of each one of said page scores, said averaged score being used to evaluate relevancy of said database to the user's query;

a selected database portion providing information related to each one of said plurality of databases being selected as relevant to the user's query, said selected database portion providing a plurality of fields;

wherein said plurality of fields further comprises:

a database location number segment providing a cross-reference to a location of a URL associated with said database in said candidate database listing;

an averaged score segment recording said averaged score for said database associated with the user's query;

a plurality of score segments, each one of said plurality of score segments recording said page score for each one of said responsive documents used to determine said averaged score;

a plurality of record segments, each one of said record segments providing a cross-reference to a location of each one of said responsive documents stored for determining said page scores;

wherein each one of said database location segments and said record segments comprise 32-bit representations of location; and wherein each one of said database location segments and said record segments comprise 64-bit representations of location for facilitating accessing more than 4.3 billion discrete locations.

* * * * *